United States Patent
Harvey

[15] 3,700,140
[45] Oct. 24, 1972

[54] METHOD AND APPARATUS FOR FEEDING PELLETED MATERIALS

[72] Inventor: Lawrence Harvey, Coldharbour, near Dorking, England

[73] Assignee: BP Chemicals Limited, London, England

[22] Filed: June 26, 1970

[21] Appl. No.: 50,287

[30] Foreign Application Priority Data

June 26, 1969    Great Britain..........32,361/69

[52] U.S. Cl. .........................222/1, 222/59, 222/134
[51] Int. Cl. ..............................................B67d 5/60
[58] Field of Search........222/134, 1, 145, 59, 14, 16; 221/9, 12; 177/69, 70; 235/98.5

[56] References Cited

UNITED STATES PATENTS

| | | | |
|---|---|---|---|
| 3,221,903 | 12/1965 | Van Geen | ..................221/9 X |
| 2,632,588 | 3/1953 | Hoar, Jr. | ..............235/98.5 X |
| 2,965,893 | 12/1960 | Barker | ............235/98.5 UX |
| 2,023,574 | 12/1935 | Cohn | .......................235/98.5 |
| 3,290,488 | 12/1966 | Sewell | ...................235/98.5 X |

Primary Examiner—Robert B. Reeves
Assistant Examiner—David A. Scherbel
Attorney—Brooks, Haidt and Haffner

[57] ABSTRACT

Granules or pellets of dissimilar materials are fed to a container in a predetermined ratio from a common feed pipe which is fed in turn from separate single line streams of counted pellets or granules metered to obtain parity with predetermined values.

9 Claims, 1 Drawing Figure

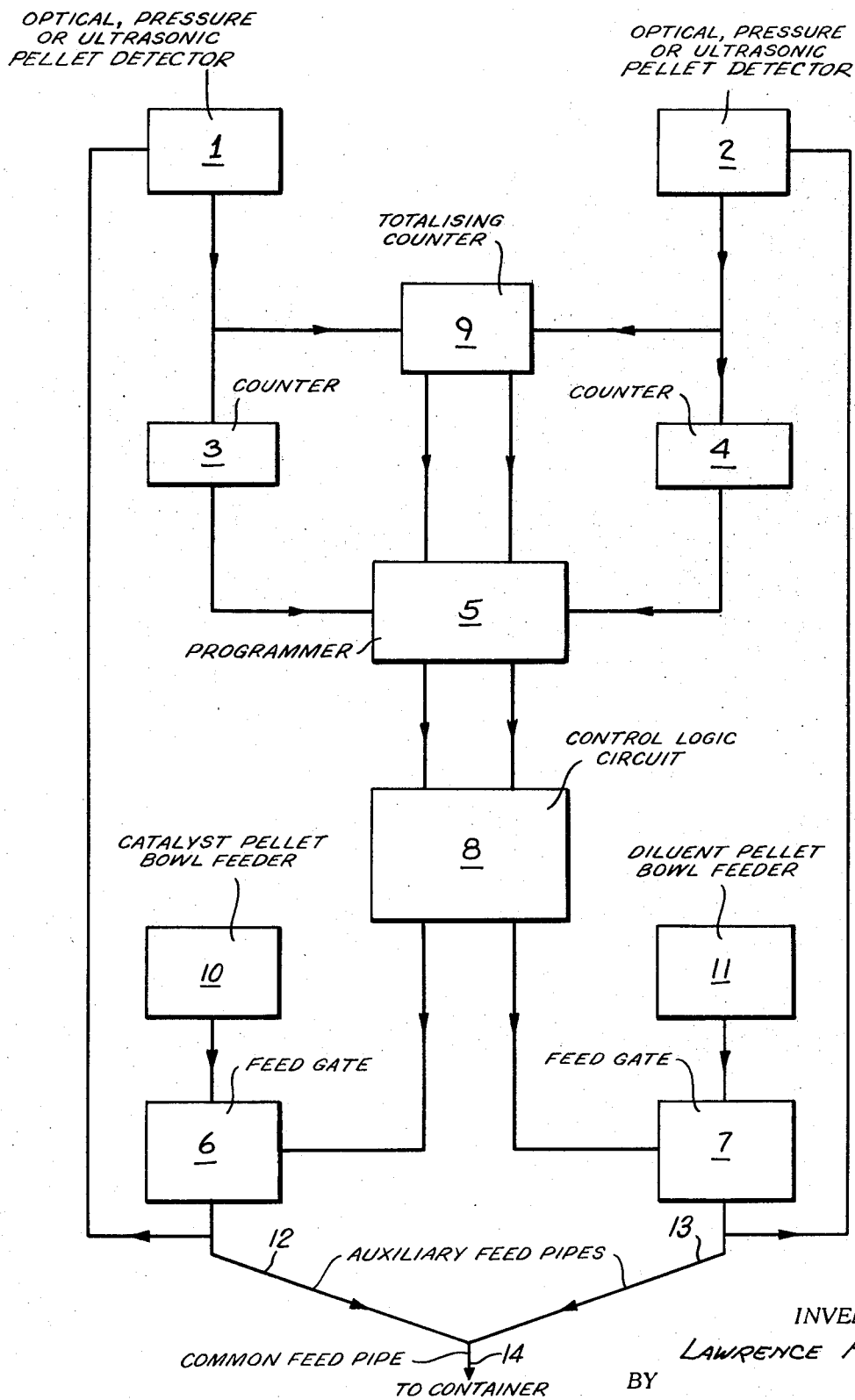

METHOD AND APPARATUS FOR FEEDING PELLETED MATERIALS

The present invention relates to a method of feeding granules or pellets of dissimilar materials to a container in a predetermined ratio and to apparatus for putting such a method into effect.

Among some of the major processes of the petrochemical industry are those processes involving vapor phase reactions in the presence of solid granular or pelleted catalysts which are in general oxides or mixed oxides of multivalent metals. Examples of such processes are the vapor phase oxidation of propylene to produce acrolein and/or acrylic acid and the reaction of propylene, oxygen and ammonia to produce acrylonitrile. In these processes the reaction is carried out in a reactor i.e. a so-called, "multitubular reactor," comprising a series of separate parallel aligned tubes of about 1" diameter, each tube being packed with granules or pellets of catalyst sometimes diluted with granules or pellets of an inert material. The initial packing of such a reactor has hitherto proved difficult and time consuming since it is necessary that each reactor tube be evenly and similarly packed in order to obtain a properly controlled reaction when the reactor is on stream. Moreover in the instance when the catalyst granules or pellets are diluted with granules or pellets of inert material it is generally desirable to establish a concentration gradient of catalyst/diluent along the length of the tube, the gradient being the same for all the tubes in the reactor shell.

It is an object of the present invention to provide a method and apparatus for feeding granular or pelleted materials to a container and in particular for feeding granular or pelleted catalyst and granular or pelleted inert diluent in predetermined ratio into the tubes of a multitubular reactor.

Accordingly the present invention is a method of feeding particles, in the form of granules or pellets, of dissimilar materials to a container in a predetermined ratio which comprises delivering to a common feed pipe separate single line streams of granules or pellets and feeding streams of pellets or granules from the common feed pipe to the container, counting the granules or pellets delivered to the common feed pipe from each single line stream and automatically adjusting the relative numbers of granules or pellets delivered from each single line stream to the common feed pipe to obtain parity with predetermined values for the granule or pellet ratio.

According to a further aspect, the present invention also provides apparatus for feeding granules or pellets of dissimilar material to a container in predetermined ratio, which comprises a common feed pipe having one end formed as a discharge nozzle and the other end in open communication with a plurality of separate auxiliary feed pipe for feeding a single line stream of granules or pellets to the pipe, counting means for counting the granules or pellets passing through each auxiliary feed pipe and connected to automatic means for adjusting the flow of granules or pellets to the common feed pipe.

The means for feeding a single line stream of granules or pellets to the auxiliary feed pipes may be mechanical means of feeding for example a bowl feeder. A particularly suitable bowl feeder for this purpose is a vibratory bowl feeder which has a rotatable bowl center which facilitates handling of less attrition resistant materials and in addition provides an exit from the bowl through which granule or pellet dusts may be removed, for example, by applying suction at the base of the bowl. Other means for feeding a single line stream of granules or pellets may comprise pneumatic means whereby the pellets are sucked into the feed pipes. The auxiliary feed pipes may be provided with means for rejecting broken pieces of granules or pellets. Such means may take the form of a slot cut in the wall of the auxiliary feed pipe the dimensions of the slot being such that broken pieces of granule or pellet may pass through whilst undamaged granules or pellets are retained within the pipe. Alternatively, when using a bowl feeder(s), the slot may be cut in the wall of the bowl feeder itself.

The counting means for counting the granules or pellets passing through each auxiliary feed pipe may comprise an optical, a pressure sensing, ultrasonic or capacitive system. It is preferred to use an optical system involving the use of a phototransistor or photodiode followed by an electronic trigger circuit. This system would supply electrical pulses to an electronic counter. The counting means is linked to means for adjusting the flow of granules or pellets through the auxiliary feed pipes to the common feed pipe. This adjusting means is automatically controlled and operates in response to a signal received from the counting means. The flow of granules or pellets may be adjusted in a number of different ways. For example the rate of delivery of a bowl feeder attached to a particular auxiliary feed line may be altered for example by variation of the supply of electric current to the bowl feeder motor. Alternatively some or all of the granules or pellets passing through an auxiliary feed pipe may be diverted from entry into the common feed pipe, such diverted granules or pellets being recycled to the respective bowl feeder on a storage container. Diversion of the granules or pellets in the feed pipe may be effected by means of a gate or trap set in the pipe or bowl feeder and operated electrically for example by means of a solenoid. Alternatively, a pneumatic system may be employed wherein gas pressure is used to force some or all of the granules or pellets to be diverted.

The accompanying drawing illustrates schematically a typical control system for a pair of bowl feeders 10 and 11 each supplying a separate auxiliary feed pipe 12 and 13.

Such a system could be employed for example in metering of catalyst and catalyst diluent to a reactor tube to obtain a predetermined catalyst concentration profile. Referring to the drawing, a pair of detectors 1 and 2, e.g. a pair of photoelectric cells, record the passage of granules or pellets of catalyst and catalyst diluent respectively through their respective auxiliary feed pipes 12 and 13. The output from the cells are passed respectively to electronic counters 3 and 4, and the signals from these counters are compared with each other and for parity with appropriate preset values corresponding to the desired catalyst composition profile desired in the reactor tube, on a ratio programming board 5. Whenever either feed stream of catalyst or diluent passing to the common feed pipe 14 reaches parity with the preset value before the other, that feed is interrupted by operation of deflecting gates 6 or 7 positioned in the auxiliary feed pipes or bowl feeders in response to a signal from the control logic 8 operating in conjunction with the ratio programming board. When the uninterrupted feed stream reaches parity with the preset value the interrupted feed is automatically restarted. To avoid cumulative errors due to time lags the counters 3 and 4 may be reset to zero immediately after reaching their parity value and any pellets or granules fed after this time would be included in the next counting cycle. The preset values are themselves adjustable according to the catalyst concentration profile required. In order that those preset values may be altered during filling to obtain a variation in concentration profile a totalizing counter 9 is provided which selects different predetermined ratios at appropriate total count values from for example a patch panel or from a block of decade switches.

It will be appreciated that the number of different streams of granules or pellets which may be fed to the container is dependent only upon the number of auxiliary feed pipes and pellet or granule feeding means provided, connected to the common feed pipe. It will also be appreciated that while specific reference has been made herein to the filing of reactor tubes any type or form of container may be filled according to or by the method or apparatus of the present invention.

What we claim is:

1. An apparatus for feeding particles of dissimilar materials in a form selected from granules and pellets, to a container in a predetermined ratio, which comprises a common feed pipe, a plurality of separate auxiliary feed pipes connected to said common feed pipe for supplying said materials thereto, means for feeding a stream of one of said materials to one of said auxiliary pipes, means for feeding a stream of another of said materials to another of said auxiliary pipes, counting means for counting the particles of material flowing in each auxiliary pipe as it flows therethrough, means connected to said counting means for continuously comparing the counts of the number of particles passing through each auxiliary pipe, and automatic adjustment means responsive to said comparing means for modifying the flow of material in at least one of said auxiliary pipes, said counting means counting the particles as they flow through each auxiliary feed pipe and said comparing means being connected to said automatic adjusting means for adjusting the flow of particles to the common feed pipe in accordance with said predetermined ratio.

2. An apparatus according to claim 1 wherein said feeding means is a bowl feeder.

3. An apparatus according to claim 2 wherein the bowl feeder is a vibratory bowl feeder.

4. An apparatus according to claim 1 wherein the means for counting the particles passing through each auxiliary feed pipe comprises an optical system.

5. An apparatus according to claim 4, wherein the optical system comprises a phototransistor.

6. An apparatus according to claim 4, wherein the optical system comprises a photodiode.

7. An apparatus according to claim 1 wherein the means for counting the particles passing through each auxiliary feed pipe is an ultrasonic system.

8. An apparatus according to claim 1 wherein the means for counting the particles passing through each auxiliary feed pipe is a pressure sensing system.

9. A method of continuously feeding particles of dissimilar materials in a form selected from granules and pellets to a container in a predetermined ratio which comprises continuously delivering to a common feed pipe separate single line streams of said particles and feeding a stream of said particles from the common feed pipe to said container, counting the particles flowing in said streams as they are delivered to the common feed pipe by each single line stream, continuously comparing the counts of the number of particles flowing in each of said single line streams as the particles are delivered to the common feed pipe and automatically controlling the flow of the particles in at least one of said streams in response to the relative counts thereof in said streams to obtain the desired ratio of said materials in said common feed pipe.

* * * * *